(12) United States Patent
Kumar et al.

(10) Patent No.: US 12,307,213 B2
(45) Date of Patent: May 20, 2025

(54) AUTOMATIC SPEECH RECOGNITION SYSTEMS AND PROCESSES

(71) Applicant: Microsoft Technology Licensing, LLC, Redmond, WA (US)

(72) Inventors: Kshitiz Kumar, Redmond, WA (US); Jian Wu, Bellevue, WA (US); Bo Ren, Bellevue, WA (US); Tianyu Wu, Suzhou (CN); Fahimeh Bahmaninezhad, San Mateo, CA (US); Edward C. Lin, Beijing (CN); Xiaoyang Chen, Suzhou (CN); Changliang Liu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 285 days.

(21) Appl. No.: 17/836,390

(22) Filed: Jun. 9, 2022

(65) Prior Publication Data

US 2023/0401392 A1    Dec. 14, 2023

(51) Int. Cl.
*G06F 40/58* (2020.01)
*G10L 15/00* (2013.01)
*G10L 15/06* (2013.01)
*G10L 15/16* (2006.01)

(52) U.S. Cl.
CPC ............ *G06F 40/58* (2020.01); *G10L 15/005* (2013.01); *G10L 15/063* (2013.01); *G10L 15/16* (2013.01)

(58) Field of Classification Search
CPC ..... G10L 15/005; G10L 15/063; G10L 15/16; G10L 15/22; G06F 40/58; G06N 3/045; H04M 3/51
See application file for complete search history.

(56) References Cited

U.S. PATENT DOCUMENTS

| | | | |
|---|---|---|---|
| 9,483,461 B2 * | 11/2016 | Fleizach | G10L 13/033 |
| 10,593,321 B2 * | 3/2020 | Watanabe | G10L 15/063 |
| 10,657,955 B2 * | 5/2020 | Battenberg | G10L 15/22 |
| 11,048,887 B1 | 6/2021 | Gupta et al. | |

(Continued)

FOREIGN PATENT DOCUMENTS

| | | |
|---|---|---|
| CN | 113345418 A | 9/2021 |
| WO | 2009151868 A2 | 12/2009 |

OTHER PUBLICATIONS

Vineel Pratap, Anuroop Sriram, Paden Tomasello, Awni Hannun, Vitaliy Liptchinsky, Gabriel Synnaeve, Ronan Collobert, "Massively Multilingual ASR: 50 Languages, 1 Model, 1 Billion Parameters", arXiv: 2007.030016v2 [eess.AS] Jul. 8, 2020 (Year: 2020).*

(Continued)

*Primary Examiner* — Paras D Shah
*Assistant Examiner* — Nadira Sultana
(74) *Attorney, Agent, or Firm* — NovoTechIP International PLLC

(57) ABSTRACT

A data processing system is implemented for receiving speech data for a plurality of languages, and determining letters from the speech data. The data processing system also implements normalizing the speech data by applying linguistic based rules for Latin-based languages on the determined letters, building a computer model using the normalized speech data, fine-tuning the computer model using additional speech data, and recognizing words in a target language using the fine-tuned computer model.

14 Claims, 6 Drawing Sheets

(56) References Cited

U.S. PATENT DOCUMENTS

| | | | |
|---|---|---|---|
| 11,158,329 | B2 | 10/2021 | Gopala et al. |
| 11,437,025 | B2* | 9/2022 | Aleksic .................... G10L 15/02 |
| 11,475,884 | B2* | 10/2022 | Ghoshal ................ G10L 15/005 |
| 11,551,668 | B1* | 1/2023 | Baevski ............... G06F 18/2155 |
| 11,809,834 | B2* | 11/2023 | Chen ....................... G06N 3/044 |
| 2020/0226327 | A1* | 7/2020 | Matusov ................ G06N 3/045 |
| 2020/0380215 | A1* | 12/2020 | Kannan ................. G10L 15/005 |
| 2021/0256961 | A1 | 8/2021 | Garman et al. |
| 2021/0280202 | A1 | 9/2021 | Wang et al. |
| 2022/0399006 | A1* | 12/2022 | Jin ........................... H04M 3/51 |

OTHER PUBLICATIONS

Murat Akbacak, John H. L. Hansen, "Spoken Proper Name Retrieval for Limited Resource Languages Using Multilingual Hybrid Representations", IEEE, vol. 18, No. 6, pp. 1486-1495, Aug. 2010 (Year: 2010).*

Min Ma, "Adaptation and Augmentation: Towards Better Rescoring Strategies for Automatic Speech Recognition and Spoken Term Detection", May 2018, The graduate center, City University of New York (Year: 2018).*

Yuki Takashima, Shota Horiguchi, Shinji Watanabe, Paola Garcia, Yoheo Kawaguchi, "Updating Only Encoders Prevents Catastrophic Forgetting of End to End ASR models", Jul. 2022, arXiv:2207.00216v1[eess.AS] (Year: 2022).*

Anton Ragni, Edgar Dakin, Xie Chen, Mark J. F. Gales, Kate M. Knill, "Multi-Language Neural Network Language Models", Sep. 2016, Interspeech, pp. 3042-3046 (Year: 2016).*

Amrhein, et al., "On Romanization for Model Transfer Between Scripts in Neural Machine Translation", In Proceedings of Conference on Empirical Methods in Natural Language Processing: Findings, Nov. 16, 2020, pp. 2461-2469.

Chen, et al., "Training Deep Bidirectional LSTM Acoustic Model for LVCSR by a Context-Sensitive-Chunk BPTT Approach", In Journal of IEEE/ACM Transactions on Audio, Speech, and Language Processing, vol. 24, Issue 7, Jul. 2016, pp. 1185-1193.

Chiu, et al., "State-of-the-Art Speech Recognition with Sequence-to Sequence Models", In Proceeding of IEEE International Conference on Acoustics, Speech and Signal Processing (ICASSP), Apr. 15, 2018, pp. 4774-4778.

Dahl, et al., "Context-Dependent Pre-Trained Deep Neural Networks for Large-Vocabulary Speech Recognition", In Journal of IEEE Transactions on Audio, Speech, and Language Processing, vol. 20, Issue 1, Jan. 2012, pp. 30-42.

Datta, et al., "Language-Agnostic Multilingual Modeling", In Proceedings of IEEE International Conference on Acoustics, Speech and Signal Processing (ICASSP), May 4, 2020, pp. 8239-8243.

Deng, et al., "Recent Advances in Deep Learning for Speech Research at Microsoft", In Proceedings of IEEE International Conference on Acoustics, Speech and Signal Processing, May 26, 2013, pp. 8604-8608.

Eyben, et al., "From Speech to Letters-Using a Novel Neural Network Architecture for Grapheme Based ASR", In Proceedings of IEEE Workshop on Automatic Speech Recognition & Understanding, Nov. 13, 2009, pp. 376-380.

Gales, et al., "Unicode-Based Graphemic Systems for Limited Resource Languages", In Proceedings of IEEE International Conference on Acoustics, Speech and Signal Processing, Apr. 19, 2015, pp. 5186-5190.

Ghahremani, et al., "Investigation of Transfer Learning for ASR Using LF-MMI Trained Neural Networks", In Proceedings of IEEE Automatic Speech Recognition and Understanding Workshop (ASRU), Dec. 16, 2017, pp. 279-286.

Giollo, et al., "Bootstrap an End-to-End ASR System by Multilingual Training, Transfer Learning, Text-to-Text Mapping and Synthetic Audio", In Repository of arXiv:2011.12696v1, Nov. 25, 2020, 5 Pages.

Heigold, et al., "Multilingual Acoustic Models Using Distributed Deep Neural Networks", In Proceedings of IEEE International Conference on Acoustics, Speech and Signal Processing, May 26, 2013, pp. 8619-8623.

Hinton, et al., "Deep Neural Networks for Acoustic Modeling in Speech Recognition: The Shared Views of Four Research Groups", In Journal of IEEE Signal Processing Magazine, vol. 29, Issue 6, Nov. 2012, pp. 82-97.

Hochreiter, et al., "Long Short-Term Memory", In Journal of Neural Computation, vol. 9, Issue 8, Nov. 15, 1997, 32 Pages.

Huang, et al., "Cross-Language Knowledge Transfer Using Multilingual Deep Neural Network with Shared Hidden Layers", In Proceedings of IEEE International Conference on Acoustics, Speech and Signal Processing, May 26, 2013, pp. 7304-7308.

Joshi, et al., "Transfer Learning Approaches for Streaming End-to-End Speech Recognition System", In Repository of arXiv:2008.05086v2, Aug. 17, 2020, 5 Pages.

Kanthak, et al., "Context-Dependent Acoustic Modelling Using Graphemes for Large Vocabulary Speech Recognition", In Proceedings of IEEE International Conference on Acoustics, Speech, and Signal Processing, May 13, 2002, 4 Pages.

Khare, et al., "Low Resource ASR: The Surprising Effectiveness of High Resource Transliteration", In Proceedings of Interspeech, Aug. 30, 2021, pp. 1529-1533.

Kumar, et al., "Bandpass Noise Generation and Augmentation for Unified ASR", In Proceedings of Interspeech, Oct. 25, 2020, pp. 1683-1687.

Le, et al., "From Senones to Chenones: Tied Context-Dependent Graphemes for Hybrid Speech Recognition", In Proceedings of IEEE Automatic Speech Recognition and Understanding Workshop (ASRU), Dec. 14, 2019, pp. 457-464.

Liu, et al., "Multilingual Graphemic Hybrid ASR with Massive Data Augmentation", In Repository of arXiv:1909.06522v1, Sep. 14, 2019, 6 pages.

Sainath, et al., "Convolutional, Long Short-Term Memory, Fully Connected Deep Neural Networks", In Proceedings of IEEE International Conference on Acoustics, Speech and Signal Processing (ICASSP), Apr. 19, 2015, pp. 4580-4584.

Sak, et al., "Fast and Accurate Recurrent Neural Network Acoustic Models for Speech Recognition", In Proceedings of Interspeech, Sep. 6, 2015, pp. 1468-1472.

Sak, et al., "Long Short-Term Memory Recurrent Neural Network Architectures for Large Scale Acoustic Modeling", In Proceedings of Interspeech, Sep. 14, 2014, pp. 338-342.

Sak, et al., "Recurrent Neural Aligner: An Encoder-Decoder Neural Network Model for Sequence to Sequence Mapping", In Proceedings of Interspeech, Aug. 20, 2017, pp. 1298-1302.

Schultz, et al., "Experiments on Cross-Language Acoustic Modeling", In Proceedings of 7th European Conference on Speech Communication and Technology, Sep. 3, 2001, 4 Pages.

Simonyan, et al., "Very Deep Convolutional Networks for Large-Scale Image Recognition", In Repository of arxiv:1409.1556v1, Sep. 4, 2014, 10 Pages.

Stoian, et al., "Analyzing Asr Pretraining For Low-Resource Speech-To-Text Translation", In Repository of arXiv:1910.10762v2, Feb. 9, 2020, 5 Pages.

Swietojanski, et al., "Unsupervised Cross-Lingual Knowledge Transfer in DNN-Based LVCSR", In Proceedings of IEEE Spoken Language Technology Workshop (SLT), Dec. 2, 2012, pp. 246-251.

Vaswani, et al., "Attention is all You Need", In Proceedings of 31st Conference on Neural Information Processing Systems, Dec. 4, 2017, 11 Pages.

Wang, et al., "Phonetic and Graphemic Systems for Multi-Genre Broadcast Transcription", In Proceedings of IEEE International Conference on Acoustics, Speech and Signal Processing (ICASSP), Apr. 15, 2018, pp. 5899-5903.

Wang, et al., "Transfer Learning for Speech and Language Processing", In Proceedings of Asia-Pacific Signal and Information Processing Association Annual Summit and Conference, Dec. 16, 2015, pp. 1225-1237.

Wang, et al., "Unispeech: Unified Speech Representation Learning with Labeled and Unlabeled Data", In Repository of arXiv:2101.07597v1, Jan. 19, 2021, 10 Pages.

(56) References Cited

OTHER PUBLICATIONS

"Unidecode 1.3.4", Retrieved from: https://pypi.org/project/Unidecode/, Retrieved Date: Mar. 17, 2022, 9 Pages.

Davis, et al., "Proposed Update Unicode Standard Annex #15 Unicode Normalization Forms", In Technical Reports, Mar. 19, 2009, 30 Pages.

"International Search Report and Written Opinion Issued in PCT Application No. PCT/US23/019028", Mailed Date: Jun. 29, 2023, 09 pages.

Pratap, et al., "Massively Multilingual ASR: 50 Languages, 1 Model, 1 Billion Parameters", In Repository of arXiv:2007.03001v2, Jul. 8, 2020, 5 Pages.

Pratap, et al., "MLS: A Large-Scale Multilingual Dataset for Speech Research", In Repository of arXiv:2012.03411v1, Dec. 7, 2020, 9 Pages.

* cited by examiner

AUTOMATIC SPEECH RECOGNITION SYSTEMS AND PROCESSES

BACKGROUND

Automatic Speech Recognition (ASR) allows for the recognition of words in acoustic applications. To build ASR systems, speech data from a target language is input into a speech recognition model for training the speech recognition model to recognize words. However, certain languages are low-resource locales, meaning they do not have relatively sufficient speech data to train the language model. Additionally, certain languages are medium-resource locales, meaning they have a moderate amount of speech data to train the language model. Further, collecting the speech data for these low-resource and medium-resource locales is a relatively costly endeavor.

Hence, there is a need for improved systems and methods of generating ASR systems for relatively low-resource and medium-resource locales.

SUMMARY

An example data processing system according to the disclosure may include a processor and a machine-readable medium storing executable instructions. The instructions when executed cause the processor to perform operations including receiving speech data for a plurality of languages; determining letters from the speech data; normalizing the speech data by applying linguistic based rules for Latin-based languages on the determined letters; building a computer model using the normalized speech data; fine-tuning the computer model using additional speech data; and recognizing words in a target language using the fine-tuned computer model.

An example method implemented in a data processing system includes receiving speech data for a plurality of languages; determining letters from the speech data; normalizing the speech data by mapping the determined letters to source letters of a source language using linguistic based rules for Latin-based languages; building a computer model using the normalized speech data; fine-tuning the computer model using additional speech data receiving target speech data of a target language; and recognizing words of the target language in the target speech data using the fine-tuned computer model.

An example machine-readable medium on which are stored instructions. The instructions when executed cause a processor of a programmable device to perform operations of receiving speech data for a plurality of different languages; determining letters from the speech data; normalizing the speech data by mapping the determined letters to source words of a source language using linguistic rule-based rules for Latin-based languages; building a computer model using the normalized speech data; fine-tuning the computer model using additional speech data; receiving target speech data of a target language; and recognizing target words of the target language in the target speech data using the fine-tuned computer model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
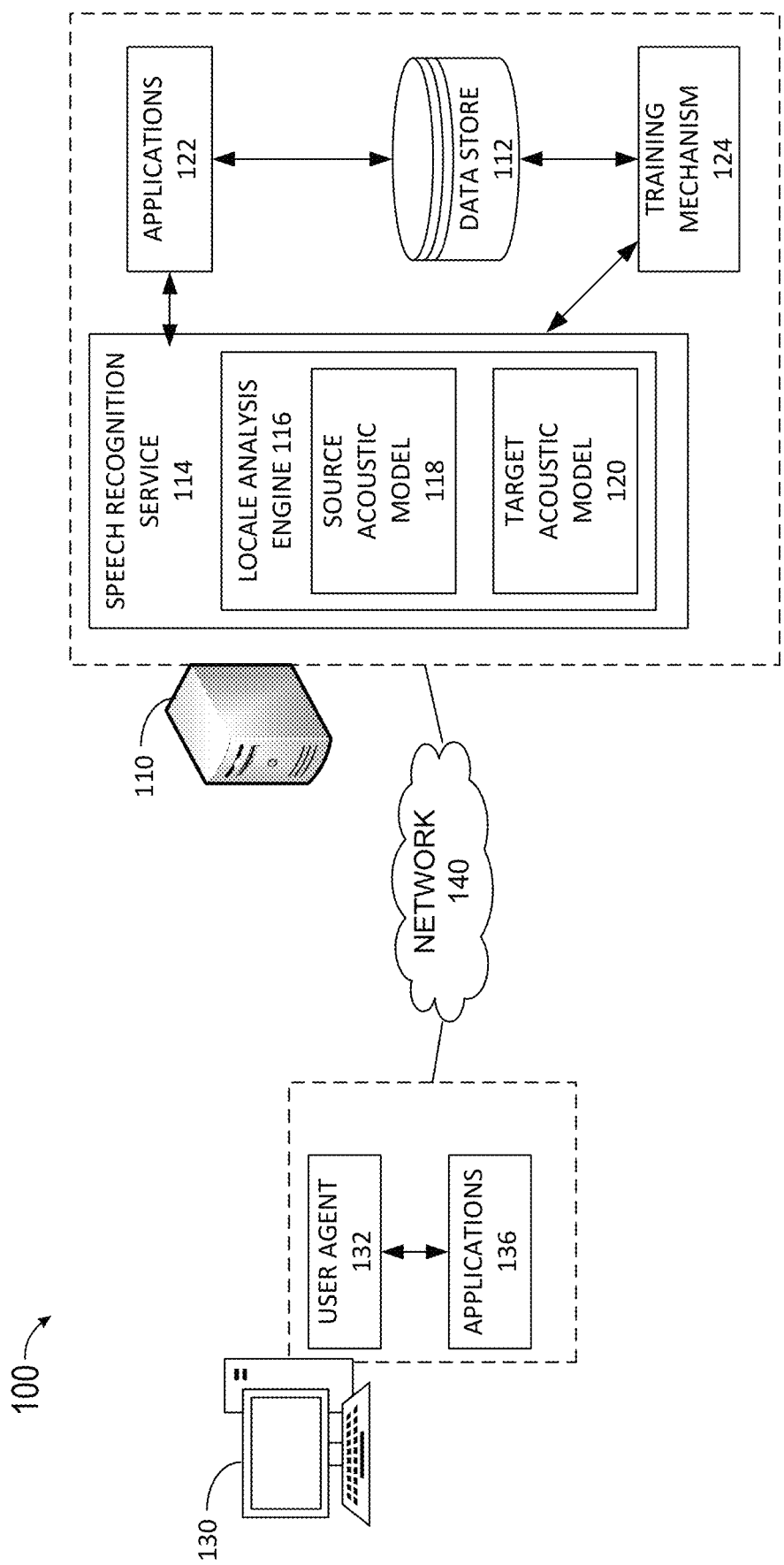
FIG. 1 depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Data is a resource for training deep learning (DL) models in Automatic Speech Recognition (ASR) systems. Specifically, the DL models use speech data from sources of speech to successfully learn recognition of words in a target locale, i.e., a language of interest. Accordingly, generating ASR systems for relatively low-resource locales, i.e., languages which have relatively low amounts of speech data available, is challenging because of this lack of speech data. In embodiments, speech data speech data includes both audio and transcription speech data. Additionally, generating ASR systems for relatively medium-resource locales, i.e., languages which have relatively moderate amounts of speech data available, is also challenging because of a relative lack of speech data. Further, speech data collection is a relatively costly endeavor for these relatively low-resource and medium-resource locales. An example of a relatively low-resource locale is Romanian, amongst other examples. As a more specific example, the Romanian locale has only around 100 hours of speech data, for example. An example of a medium-resource locale is Bulgarian, amongst other examples. As a more specific example, the Bulgarian locale has about 10,000 hours of speech data, for example. Accordingly, the amount of speech data for these relatively low-resource and medium-resource locales from this relatively costly collection of data may still be insufficient to train the DL models.

In comparison, relatively high-resource locales are languages which have abundant speech data, i.e., languages which each have over 10,000 hours of speech data. In this way, the speech data includes over 10,000 hours of speech data for each language. An example of a relatively high-resource locale is English, amongst other examples. As a more specific example, the English locale has over one million hours of speech data, for example. In this way, ASR systems for relatively high-resource locales have relatively abundant speech data to train the DL models. However, issues arise when using speech data from these relatively high-resource locales as training data for the DL models for relatively low-resource and medium-resource locales. One technical problem that arises is because phones, i.e., sounds, of a relatively high-resource locale may be unique to that language. Specifically, linguists represent words in a locale as a sequence of phones, i.e., sounds, with the phones closely following pronunciations of the words in that locale. In this way, phones are historically locale-dependent and may not be present in other locales. Another technical problem that arises is that a relatively expert level of linguistic knowledge is needed to create a sequence of phones for a word in a locale. Further, these phones can vary across linguists, thereby resulting in a variance of a number of phones for a locale. As an example, the relatively high-resource locale of English typically includes 30-45 locale-dependent phones in view of variances across linguists. Accordingly, speech data from relatively high-resource locales is not suitable as training data for the DL models for relatively low-resource and medium-resource locales because of issues that arise from these phones.

To address these technical problems of a lack of speech data for low-resource and medium-resource locales, and an inability to use speech data of a relatively high resource locale, this description discloses several technical solutions for generating ASR systems for relatively low-resource and medium-resource locales. For example, this description discloses a technical solution of receiving speech data for a plurality of languages. This technical solution of receiving speech data for a plurality of languages allows for a relatively adequate amount of speech data to be available for developing and training speech recognition models for relatively low-resource and medium-resource locales. As another example, the description discloses a technical solution of normalizing the speech data by applying linguistic based rules for Latin-based languages on determined letters in the speech data. This technical solution of normalizing the speech data allows for an ASR system of a low-resource locale to utilize the speech data for training, even if the speech data is from another language. As an additional example, the description discloses a technical solution of fine-tuning a computer model using additional speech data. This technical solution of fine-tuning a computer model allows for further development of an ASR system, thereby helping to improve accuracy in speech recognition. Further, to utilize the speech data, aspects of the instant application map graphemes of a source language in the speech data to common Romanized letters, i.e., a common grapheme output. This technical solution of mapping the speech data to common Romanized letters allows for a translation of words in the speech data from the source locale to a target locale of the ASR system, thereby facilitating transfer learning. Accordingly, transfer learning techniques allow for data sharing and cross language learning using the common grapheme output for relatively newer languages and/or languages which are relatively low-resource and medium-resource locales. In this way, aspects of the instant application facilitate language expansion by forming a bridge from relatively high-resource locales to relatively low-resource and medium-resource locales.

As will be understood by persons of skill in the art upon reading this disclosure, benefits and advantages provided by such implementations can include, but are not limited to, a technical solution to the technical problems of inefficient, inaccurate and/or expensive speech recognition of words of a locale. Technical solutions and implementations provided here optimize the process of speech recognition for identifying words in a locale. These words are recognized by utilizing deep learning models that are highly accurate, yet simpler to train and use than existing mechanisms because of significant training data from a plurality of locales. The benefits made available by these technical solutions allow for speech recognition for a relatively low-resource locale, thus increasing efficiency and decreasing expenses for an ASR system for a relatively low-resource locale. Additionally, the benefits made available by these technical solutions allow for speech recognition for a relatively medium-resource locale, thus increasing efficiency and decreasing expenses for an ASR system for a relatively medium-resource locale.

As a general matter, the methods and systems described herein may include, or otherwise make use of, a machine-trained model to identify words from speech data. Machine learning (ML) generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in people's speech, determine associations between spoken words and/or identify filler words or speaking disfluency in speech. Such determination may be made following the accumulation, review, and/or analysis of user data from a large number of users over time, that may be configured to provide the ML algorithm (MLA) with an initial or ongoing set of training data. In addition, in some implementations, a user device can be configured to transmit data captured locally during use of relevant application(s) to the cloud or the local ML program and provide supplemental training data that can serve to fine-tune or increase the effectiveness of the MLA. The supplemental data can also be used to facilitate identification of words and/or to increase the training data for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a stacked trained ML model may be produced.

The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

FIG. 1 illustrates an example system 100, upon which aspects of this disclosure may be implemented. The system 100 may include a server 110 which may be connected to or include a data store 112 which may function as a repository in which datasets relating to training models, data relating to a speech recognition service 114 and/or data relating to applications 122 may be stored. Although shown as a single data store, the data store 112 may be representative of multiple storage devices and data stores which may be connected to each of the speech recognition service 114, applications 122 or acoustic models 118 and 120. Moreover, the server 110 may include a plurality of servers that work together to deliver the functions and services provided by each service or application. The server 110 may operate as a shared resource server located at an enterprise accessible by various computer client devices such as client device 130. The server 110 may also operate as a cloud-based server for offering speech rehearsal assistance services in one or more applications such as applications 122.

The server 110 may include and/or execute the speech recognition service 114 which may provide speech recognition utilizing an application on their client devices such as client device 130. The speech recognition service 114 may operate to examine speech data received from a user's client device 130 via an application (e.g., applications 122 or applications 136), examine the speech data and provide feedback to the user regarding their speech or presentation. In an example, the speech recognition service 114 may utilize a locale analysis engine 116 to examine speech data for recognition of words in a locale, i.e., a language. To achieve this, the locale analysis engine 116 may make use of deep learning models, i.e., acoustic models 118 and 120, that operate together to provide accurate speech recognition results. These computer models may include a transformer model, a convolutional transformer model (CTFM), a Long Short-Term Memory (LSTM) model, a Bidirectional Long Short-Term Memory (BLSTM) model, a Latency Control Bidirectional Long Short-Term Memory (LC-BLSTM) model, and/or a Gaussian Mixture Model based Hidden Markov Model (GMM-HMM). Other models may also be used.

Each of the acoustic models 118 and 120 used as part of the speech recognition service 114 may be trained by a training mechanism 124 such as mechanisms known in the art. The training mechanism 124 may use training datasets stored in the data store 112 or at other locations to provide initial and ongoing training for each of the acoustic models 118 and 120. In one implementation, the training mechanism 124 may use speech training data from the data store 112 to train each of the models 118 and 120 via deep neural networks. The initial training may be performed in an offline stage.

In one implementation, the sets of training data include speech data received from the client device 130. In embodiments, the speech data includes words of a locale, e.g., English words. In further embodiments, the speech data includes words of a plurality of locales, i.e., multilingual speech data. As an example, the plurality of locales includes English, French, Italian, German, and Spanish languages. In further examples, the plurality of locales includes Japanese and Chinese languages, amongst other examples. In this way, the speech data includes words from plurality of different languages.

In embodiments, the speech data is derived from sources of speech. As an example, the speech data is derived from video, broadcast news, and dictation sources, amongst other speech data sources. In this way, the speech data includes data from video, broadcast news, and dictation sources for English, French, Italian, German, and Spanish languages. As a further example, the speech recognition service 114 receives speech data from a dictation source in response to a user of the client device 130 dictating speech into an input device, e.g., a microphone, of the client device 130. In further embodiments, the speech data used for training can include speech data which was supervised, semi-supervised, unsupervised, and/or combination of some and/or all.

In embodiments, the data store 112 may also include testing sets for testing the acoustic models 118 and 120 after they have been trained to ensure their accuracy. In one implementation, the types of data used for the sets of training data to train the acoustic models 118 and 120 may be different from the types of data used in the sets of testing data for testing the models. In an example, speech data from dictation sources is used for training data and development of the models, while speech data from transcription sources is utilized to evaluate accuracy of the acoustic models 118 and 120.

In embodiments, the client device 130 may be connected to the server 110 via a network 140. The network 140 may be a wired or wireless network(s) or a combination of wired and wireless networks that connect one or more elements of the system 100. The client device 130 may be a personal or handheld computing device having or being connected to input/output elements that enable a user to interact with various applications (e.g., applications 122 or applications 136). Examples of suitable client devices for client device 130 include but are not limited to personal computers, desktop computers, laptop computers, mobile telephones; smart phones; tablets; phablets; smart watches; wearable computers; gaming devices/computers; televisions; and the like. The internal hardware structure of a client device, e.g., client device 130, is discussed in greater detail in regard to FIGS. 5 and 6.

The client device 130 may include one or more applications 136. Each application 136 may be a computer program executed on the client device 130 that configures the device to be responsive to user input to allow a user to provide speech data in the form of words, e.g., spoken and/or written, via the application 136. Examples of suitable applications include, but are not limited to, a productivity application (e.g., job searching application that provides a job interview coach or a training application that trains employees such as customer service staff on responding to customers, etc.), a presentation application (e.g., Microsoft PowerPoint), a document editing application, a communications application or a standalone application designed specifically for providing speech rehearsal assistance.

In some examples, applications used to receive speech data from user input and provide speech recognition may be executed on the server 110 (e.g., applications 122) and be provided via an online service. In one implementation, web applications may communicate via the network 140 with the user agent 132, such as a browser, executing on the client device 130. The user agent 132 may provide a user interface that allows the user to interact with applications 122 and may enable applications 122 to provide speech data to the speech recognition service 114 for processing. In other examples, applications used to receive speech data and provide speech recognition may be local applications such as the applications 136 that are stored and executed on the client device 130 and provide a user interface that allows the user to interact with application. User data from applications 136 may also be provided via the network 140 to the speech recognition service 114 for use in providing speech recognition. In even further examples, the speech recognition service 114 may be applied directly on a device, e.g., client device 130.

Figure 2:
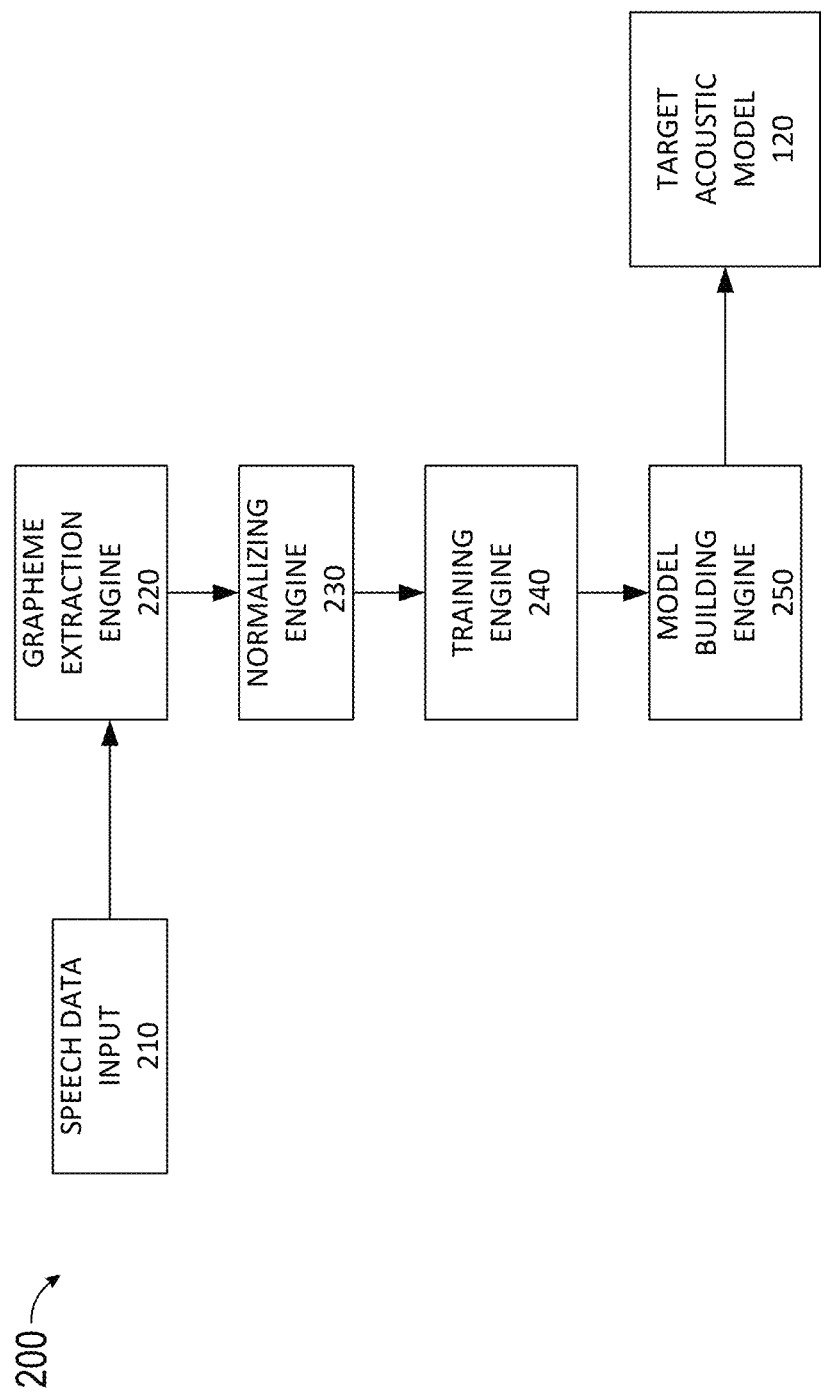
FIG. 2 depicts a simplified architecture for operations of a locale analysis engine used to recognize speech.

FIG. 2 depicts a simplified architecture 200 for use by the locale analysis engine 116 to develop acoustic models 118 and 120 for speech recognition of words of a target locale, i.e., a language of interest. Architecture 200 may include speech data input 210 which may be received from client device 130. In embodiments, the speech data input 210 includes speech data from a plurality of locales. In this way, the speech data input 210 is multilingual speech data. In further embodiments, the speech data input 210 is collected from video, broadcast news, and dictation sources, amongst other speech data sources.

In embodiments, in response to the speech recognition service 114 collecting the speech data input 210 and the locale analysis engine 116 receiving the speech data input 210, the locale analysis engine 116 implements a grapheme extraction engine 220. In embodiments, the grapheme extraction engine 220 analyzes the speech data input 210 for graphemes. Generally, ASR systems use phones as training data for acoustic models. However, phones of a locale may be unique to that locale. Specifically, linguists represent words in a locale as a sequence of phones, i.e., sounds, with the phones closely following pronunciations of the words in that locale. In this way, phones are historically locale-dependent and may not be present in other locales. Additionally, phones can vary across linguists, thereby resulting in a variance of a number of phones for a locale. Table 1 below shows an example of various phones of different locales for pronouncing the word "president" across the locales English, French, Italian, German, and Spanish locales.

TABLE 1

Lexicon across locales for a common word "president".

| EN | p | r | eh | z | ih | d | ax | n | t |
| FR | p | r | ey | z | iy | d | an | | l_t |
| IT | p | r | e | z | i | d | eh | n | t |
| DE | p | hr | e_ | z | i_ | d | eh | n | t |
| ES | p | r | e | s | i | d | e | n | t |

As can be seen in Table 1, the word "president" in the English locale includes the phones "p," "r," "eh," "z," "ih," "d," "ax," "n," and "t." In comparison, the word "president" in the French locale includes "p," "r," "ey," "z," "iy," "d," "an," and "l_t." In this example, the phone "l_t" is present only in the French locale and is not shared by the English, Italian, German, and Spanish locales. As another example, the word "president" in the Italian locale includes "p," "r," "e," "z," "i," "d," "eh," "n," and "t." As a further example, the word "president" in the German locale includes "p," "hr," "e_," "z," "i_," "d," "eh," "n," and "t." In this example, the phones "e_," "i_," are present only in the German locale and are not shared by the English, French, Italian, and Spanish locales. As an additional example, the word "president" in the Spanish locale includes "p," "r," "e," "z," "i," "d," "e," "n," and "t." In view of Table 1, each locale may include phones which are not present in other locales. Additionally, phones and corresponding phone notations may be completely independent across locales. For example, some locales may use a particular phone notation of "e," but an underlying sound of this phone notation be completely different among those locales.

In view of these differences in phones, locales may share a limited number of senones. In embodiments, a senone is a cluster of sounds that includes a first sound, a middle sound, and a final sound. In this way, senones are triphones. Table 2 below shows a percentage (%) sharing of senones amongst different locales.

TABLE 2

Mutual sharing statistics for senones. Similar sharing for graphemic chenone units has 90+% for all locale pairs.

| Mutual Sharing [%] | EN | FR | IT | DE | ES |
|---|---|---|---|---|---|
| EN | 30 | 21 | 12 | 16 | 7 |
| FR | | 26 | 12 | 13 | 7 |
| IT | | | 28 | 15 | 20 |
| DE | | | | 30 | 10 |
| ES | | | | | 21 |

As can be seen in the above Table 2, different locales may share a limited number of senone pairs. As an example, the English locale and the French locale share about 21% of senones, while the English locale and the Spanish locale share about 7% of senones. Accordingly, using speech data that includes multilingual speech data raises challenges in view of the different phones of different locales.

In embodiments, aspects of the instant application address these challenges of locales having different phones by utilizing the graphemes present in the speech data input 210 instead of phones. In embodiments, the locale analysis engine 116 implements the grapheme extraction engine 220 to determine graphemes in the speech data input 210. In embodiments, the grapheme extraction engine 220 uses language processing techniques, e.g., natural language processing techniques. In embodiments, a grapheme is a letter of a locale. As an example, the letter "p" is a grapheme in the English word "president."

In response to determining the graphemes, the locale analysis engine 116 implements a normalizing engine 230 which normalizes the speech data input 210 using the determined graphemes. In embodiments, the normalizing engine 230 normalizes the determined graphemes by Romanizing the determined graphemes. In embodiments, Romanizing the determined graphemes includes mapping each grapheme of the determined graphemes to source graphemes of a source locale. In embodiments, the source locale is a Latin-based language, hence a Roman language. In this way, a locale is a language. As an example, the source locale is the English language, amongst other Latin-based languages. In this example, Romanization includes writing words of foreign languages in English only letters. In this way, graphemes are letters of a language.

In embodiments, the normalizing engine 230 maps the determined graphemes to the source graphemes in view of rules. In embodiments, the rules are linguistic based rules for Latin-based languages developed by expert linguists, amongst other examples of rules. In this way, normalizing the speech data includes mapping the determined letters to source letters of a source language using the linguistic based rules. As an example, a rule indicates that the graphemes a, á, à, â, ä, å, a should be mapped to the English source grapheme "a." As another example, a rule indicates that German grapheme "ß" should be mapped to the English source graphemes "ss." Further examples of rules include mapping grapheme "ç" to English source grapheme "c," mapping grapheme "ê" to English source grapheme "e," and mapping grapheme "ï" to English source grapheme "i," amongst other examples of rules. In this way, mapping the determined graphemes to graphemes in a target locale allows for translation of words in the speech data from the source locale to the target locale.

Table 3 below further illustrates Romanization examples of Romanizing speech data from Spanish, German, French, Japanese, and Chinese locales.

TABLE 3

Romanization examples.

| Locales | Original Form | Romanized |
|---|---|---|
| ES | aña | ana |
| DE | flöß | floss |
| FR | café | cafe |
| JP | 常世 | tokoyo |
| CN | 争 | zheng |

As shown in Table 3, a Romanization example includes the Spanish word "aria" being Romanized by the normalizing engine 230 into the English word "ana." Specifically, the grapheme "a" in Spanish maps to the grapheme "a" in English in view of linguistic based rules. In this way, the letter "a" in Spanish maps to the letter "a" in English. Further, the grapheme "ñ" in Spanish maps to the grapheme "n" in English, and the grapheme "a" in Spanish maps to the grapheme "a" in English. In this way, the normalizing engine 230 normalizes the words in the speech data input 210 by mapping graphemes of the words in the speech data input 210 to graphemes of a Latin-based language, which serves as a source locale. Table 4 below shows examples of an amount of speech data for each locale for the speech data input 210 in thousands (k) of hours.

TABLE 4

Multilingual 75k-hrs Training Data.

| Locales | EN | FR | IT | DE | ES |
|---|---|---|---|---|---|
| Data [×1000 hrs] | 32.8 | 10.6 | 9.9 | 9.3 | 12.3 |

As shown in Table 4, the speech data input 210 includes about 32.8 k, i.e., 32,800, hours of speech data for the English locale. Further, the speech data input 210 includes about 10.6 k hours of speech data for the French locale, about 9.9 k hours of speech data for the Italian locale, about 9.3 k hours of speech data for the German locale, and about 12.3 k hours of speech data for the Spanish locale.

In response to normalizing the speech data input 210, the locale analysis engine 116 implements a training engine 240 to train a multilingual source acoustic model 118 of FIG. 1 using the normalized speech data. In embodiments, the source acoustic model 118 is multilingual since the speech data input 210 contains a plurality of locales, and the source acoustic model 118 is trained using the normalized speech data which contains this plurality of locales. In embodiments, the source acoustic model 118 is a computer model and may be a transformer model, a convolutional transformer model (CTFM), a Long Short-Term Memory (LSTM) model, a Bidirectional Long Short-Term Memory (BLSTM) model, a Latency Control Bidirectional Long Short-Term Memory (LC-BLSTM) model, and/or a Gaussian Mixture Model based Hidden Markov Model (GMM-HMM).

In embodiments, the training engine 240 trains the source acoustic model by predicting words in the source language using the normalized speech data. Further, the training engine 240 uses these predicted words to build a knowledge base from the speech data input 210. In embodiments, the training engine 240 predicts the words using linguistic ruled-based rules. As an example, the training engine 240 predicts the English word "cafe" in view of linguistic rule-based rules for the determined graphemes "c," "a," "f," and "é." In embodiments, as the training engine 240 continues to receive normalized speech data, the training engine 240 will continue to predict words and build a knowledge base in the source acoustic model.

In embodiments, in response to the source acoustic model having been trained over a threshold amount of speech data from the speech data input 210, the locale analysis engine 116 implements a model building engine 250 to build the target acoustic model 120 of FIG. 1. In embodiments, the model building engine 250 builds the target acoustic model 120 using the source acoustic model. Specifically, top layers of the source acoustic model are replaced to generate the target acoustic model 120. More specifically, a softmax layer of the source acoustic model is replaced with softmax layers which are directed a target locale, while the bottom layers of the source acoustic model 118 contain the knowledge base which is used by the target acoustic model 120. In this way, the learnings of the source acoustic model 118 are transferred over to the target acoustic model 120. More specifically, the locale analysis engine 116 implements multilingual transfer learning from the source acoustic model 118 to the target acoustic model 120 using the speech data input 210.

In embodiments, the target acoustic model 120 may be trained with additional speech data from the speech data input 210 to fine-tune the knowledge base. Specifically, the number of layers which are fine-tuned depends on an amount of speech data available for further training the target acoustic model 120. As an example, for a relatively ultralow resource locale, i.e., a resource local having an amount of speech data even low than a low-resource locale like Romanian, all of the bottom layers of the target acoustic model 120 remain the same, while only a single top layer of the target acoustic model 120 is fine-tuned with the additional speech data. In this example, the target acoustic model 120 has a top layer fine-tuned by the additional speech data. As another example, for a relatively low resource locale, e.g., Romanian, about 25-50% of bottom layers of the target acoustic model 120 remain the same, while remaining top layers of the target acoustic model 120 are fine-tuned with the additional speech data. As an additional example, for a relatively high resource locale, e.g., Spanish, all layers of the target acoustic model 120 are fine-tuned with the additional speech data. In this way, a select number of bottom layers and/or top layers remain the same or all the layers can be fine-tuned. Accordingly, fine-tuning of the layers of the target acoustic model 120 using additional speech data depends on various factors, including model size, an amount of speech data, and/or and data domains.

Figure 3:
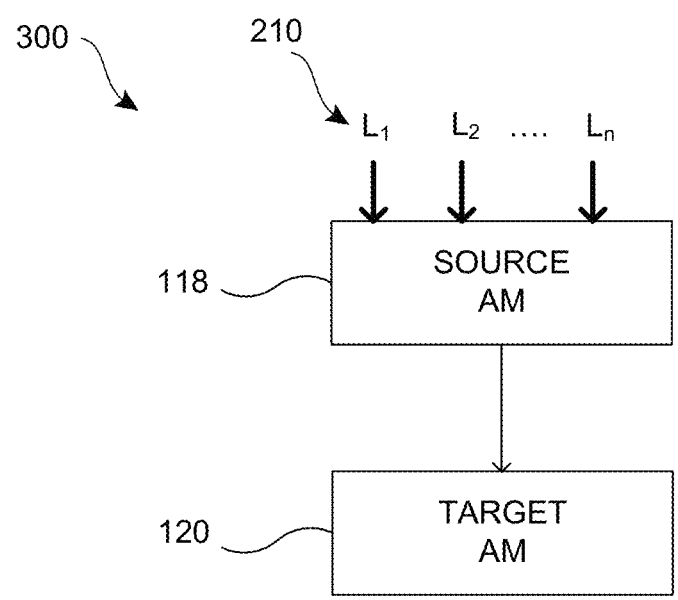
FIG. 3 depicts building a target acoustic model from a source acoustic model.

FIG. 3 depicts a simplified block diagram 300 of transfer learning from the source acoustic model (AM) 118 to the target acoustic model 120. In embodiments, the speech recognition service 114 receives the speech data input 210 from the client device 130. In embodiments, the speech data input 210 is multilingual speech data because it includes a plurality of different locales, i.e., $L_1, L_2, \ldots L_n$. In embodiments, the different locales include any combination of languages. For example, the speech data input 210 includes at least one of English, French, Italian, German, and Spanish languages, amongst other languages. In this way, many more languages in addition to English, French, Italian, German, and Spanish can be used in the transfer learning process.

In embodiments, the locale analysis engine 116 of the speech recognition service 114 normalizes the speech data input 210 and trains the source acoustic model 118 using the normalized speech data. Following training of the source acoustic model 118, the locale analysis engine 116 builds the target acoustic model 120 using the model building engine 250. In embodiments, the building of the target acoustic model 120 includes replacing the top softmax layers of the source acoustic model 118 with softmax layers directed to a target locale.

In embodiments, the locale analysis engine 116 of the speech recognition service 114 uses the target acoustic model 120 to recognize words of a target locale. In embodiments, the target locale may be a relatively low-resource locale. As an example, the relatively low-resource locale is Romanian and the locale analysis engine 116 uses the target acoustic model 120 to recognize words in the Romanian locale. In this example, the locale analysis engine 116 uses the target acoustic model 120 to recognize words in the target language of Romanian. In embodiments, as the locale analysis engine 116 collects speech data in the target locale, the knowledge base in the target acoustic model 120 continues to build. In this way, the locale analysis engine 116 finetunes the target acoustic model 120 in view of continuing speech data. In further embodiments, the target locale may be a relatively medium-resource locale. As an example, the relatively medium-resource locale is Bulgarian and the locale analysis engine 116 uses the target acoustic model 120 to recognize words in the Bulgarian locale.

Table 5 below provides examples of the benefits of using the target acoustic model 120 in ASR systems compared to ASR systems based on phones and graphemes alone for the English, French, Italian, German, and Spanish locales.

TABLE 5

WER[%] evaluation for multilingual model on the constituent high resource locales.

| Locales | Multilingual | | |
|---|---|---|---|
| | Phonetic | Graphemic | Romanized |
| EN | 15.3 | 14.3 | 12.8 |
| FR | 25.6 | 21.4 | 20.1 |

TABLE 5-continued

WER[%] evaluation for multilingual model on the constituent high resource locales.

| Locales | Multilingual | | |
|---|---|---|---|
| | Phonetic | Graphemic | Romanized |
| IT | 22.1 | 17.5 | 15.5 |
| DE | 15.3 | 13.4 | 12.3 |
| ES | 16.5 | 15.8 | 15.1 |
| Average | 19.0 | 16.5 | 15.1 |

As can be seen in Table 5, English ASR systems based on phones alone have about a 15.3 word error rate percentage (WER %), while English ASR systems based on graphemes alone have about a 14.3 WER %. In comparison, English ASR systems based on Romanized speech data have about a 12.8 WER %. As a further example, French ASR systems based on phone speech data alone have about a 25.6 WER %, French ASR systems based on grapheme speech data alone have about a 21.4 WER %, and French ASR systems based on Romanized speech data have about a 20.1 WER %.

Table 6 below shows the improvements to ASR systems for the Italian locale utilizing aspects of the instant application. For example, when the ASR system is based on graphemes alone, the WER % is 17.5%. In comparison, when the ASR system is based on Romanized speech data, the WER % drops down to 15.5%. In embodiments, the WER % drops even lower as the target acoustic model is fine-tuned, i.e., is further trained with additional speech data.

TABLE 6

Multilingual TL for IT. The corresponding multilingual phonetic WER for IT is 22.1% (see Table 5).

| Source TL Models | Baseline w/o TL [1] | Multilingual | |
|---|---|---|---|
| | | Graphemic | Romanized |
| IT | 13.8 | 17.5 | 15.5 |
| +Finetune | | 13.9 | 12.6 |
| WERR over [1] | | −0.8 | 8.7 |

Table 7 below shows the improvements to ASR systems for the Romanian locale utilizing aspects of the instant application. As can be seen in Table 7, the WER % is reduced from 6.3% for phone based ASR systems using speech data from video sources to 5.7% utilizing the disclosed Romanized speech data.

TABLE 7

WER [%] from TL to 50-hrs RO data.

| Source TL Models | Baseline w/o TL [1] | en-US [2] | Multilingual | |
|---|---|---|---|---|
| | | | Phonetic | Romanized |
| Video | 10.1 | 6.6 | 6.3 | 5.7 |
| B. News | 24.6 | 16.1 | 15.3 | 14.7 |
| Dict. | 14.1 | 11.0 | 10.7 | 10.4 |
| Average WERR | 16.3 | 11.2 | 10.8 | 10.3 |
| over [1] | | 30.9 | 33.8 | 36.9 |
| over [2] | | | 4.2 | 8.6 |

Table 8 below shows the improvements to ASR systems for other locales utilizing aspects of the instant application. As can be seen in Table 8, the WER % is reduced from 21.2% to 11.1% for the Bulgarian (BG) locale. Further, the WER % is reduced from 32.9% to 18.4% for the Estonian (EE) locale. In addition, the WER % is reduced from 15.9% to 7.9% for the Slovak (SK) locale.

TABLE 8

Multilingual Romanized TL for other locales.

| Source TL Models | Baseline w/o TL | Multilingual Romanized |
|---|---|---|
| BG | 21.2 | 11.1 |
| EE | 32.9 | 18.4 |
| SK | 15.9 | 7.9 |

Table 9 below shows differences for ASR systems for a Romanian locale utilizing phones and graphemes across different speech data sources. Specifically, Table 9 illustrates the WER % using speech data input 210 obtained from a video source, a broadcast news (B. News) source, and a dictation (Dict.) source. As can be seen in Table 9, the WER % is reduced from an average of 16.3% for all speech data sources to 10.3% for graphemes.

TABLE 9

WER [%] for training with All 50-hrs
RO data vs. only Broadcast News (25 hrs)

| Models | Baseline | | Multilingual Graphemic | |
|---|---|---|---|---|
| Train | All | B. News | All | B. News |
| Video | 10.1 | 14.0 | 5.7 | 7.5 |
| B. News | 24.6 | 27.9 | 14.7 | 15.2 |
| Dict. | 14.1 | 23.3 | 10.4 | 11.5 |
| Average | 16.3 | 21.7 | 10.3 | 11.4 |

As shown in Table 9, the transfer learning techniques used to build the target acoustic model 120 allow for a stronger generalization to unseen data scenarios. As an example, if the source for the speech data input 210 was only a B. News source, the WER % would be higher than a WER % for speech data input 210 obtained from a plurality of different speech data sources.

In embodiments, by having the source acoustic model 118 trained with the normalized speech data covering a plurality of locales, the speech recognition service 114 also allows for a reduction in false alarms for keyword verification. Specifically, the source acoustic model 118 allows for relatively more accurate recognition of words in different locales, e.g., non-English speech data. In embodiments, a false alarm occurs when a word in one locale is mistaken for a keyword in another locale. In embodiments, a keyword is a word which activates a device. For example, a keyword may be a word which activates a smart hub device in the home. Since the locale analysis engine 116 of the speech recognition service 114 allows for recognition of words in a plurality of locales by normalizing the speech data, the locale analysis engine 116 does not mistake a word in one locale as a keyword in another locale.

Figure 4:
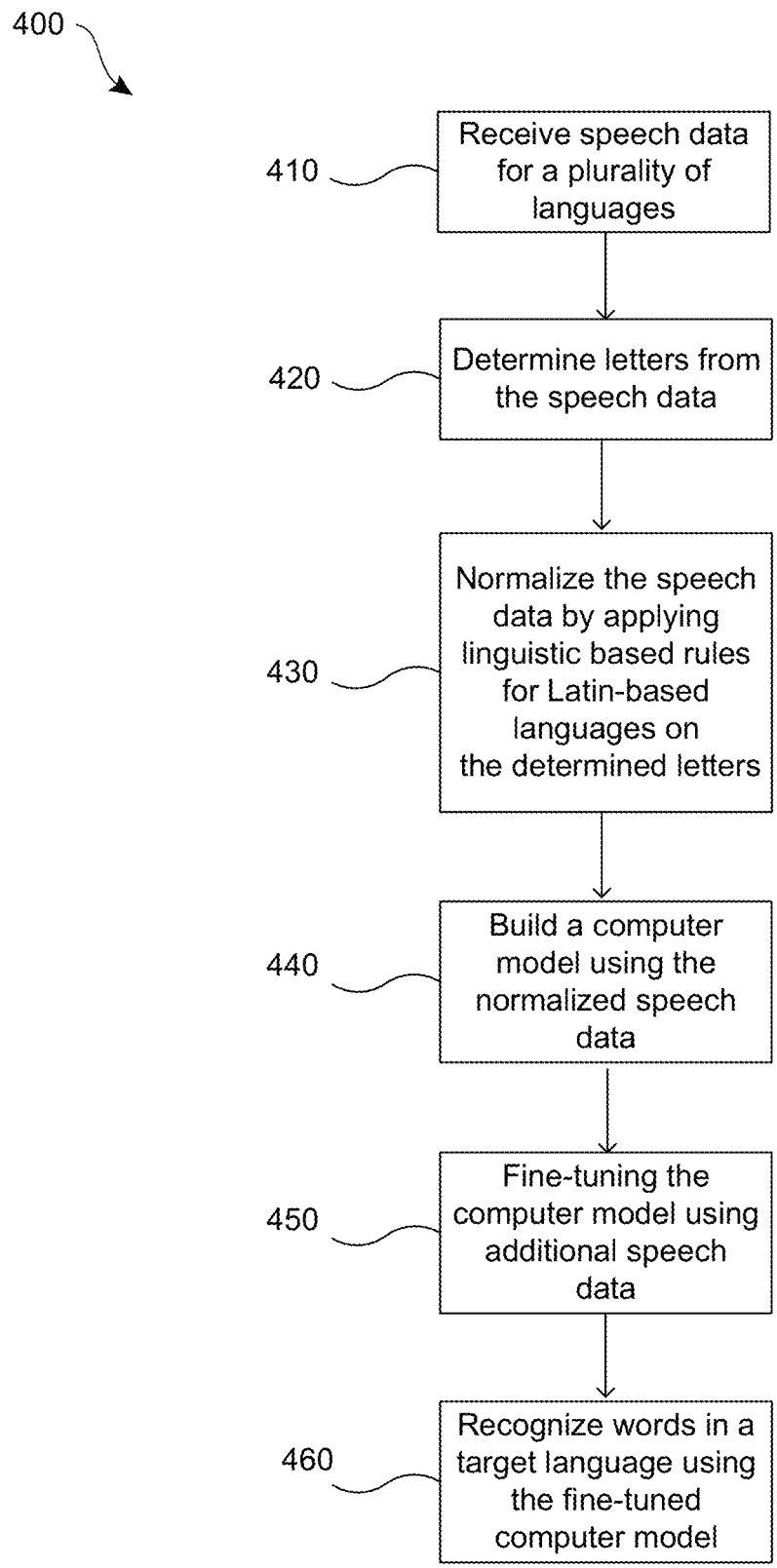
FIG. 4 is a flow diagram of a process for recognizing words in a target locale.

FIG. 4 is a flow diagram of a process 400 for recognizing words in a target locale. At step 410, the speech recognition service 114 receives speech data for a plurality of locales. In embodiments, the speech recognition service 114 receives the speech data input 210 from the client device 130.

At step 420, the speech recognition service 114 determines letters from the speech data. In embodiments, the speech recognition service 114 determines letters from the speech data input 210 by utilizing language processing techniques.

At step 430, the speech recognition service 114 normalizes the speech data by applying linguistic based rules for Latin-based languages on the determined letters. In embodiments, the speech recognition service 114 normalizes the speech data by mapping the determined graphemes to source graphemes of a source language. In embodiments, the speech recognition service 114 uses the normalized speech data to train a source acoustic model, thereby generating a knowledge base.

At step 440, the speech recognition service 114 builds a computer model using the normalized speech data. In embodiments, the speech recognition service 114 builds the target acoustic model 120 using the normalized speech data by replacing a top softmax layer of the source acoustic model 118 with a softmax layer directed to a target locale, thereby building the target acoustic model 120.

At step 450, the speech recognition service 114 fine-tunes the computer model using additional speech data. In embodiments, the speech recognition service 114 fine-tunes a top layer of the target acoustic model 120 using the additional speech data.

At step 460, the speech recognition service 114 recognizes words in a target locale using the fine-tuned computer model. In embodiments, the speech recognition service 114 recognizes words in a target locale using the target acoustic model 120 by receiving speech data in the target locale from the client device 130, and using the locale analysis engine 116 to recognize words in the target locale.

Figure 5:
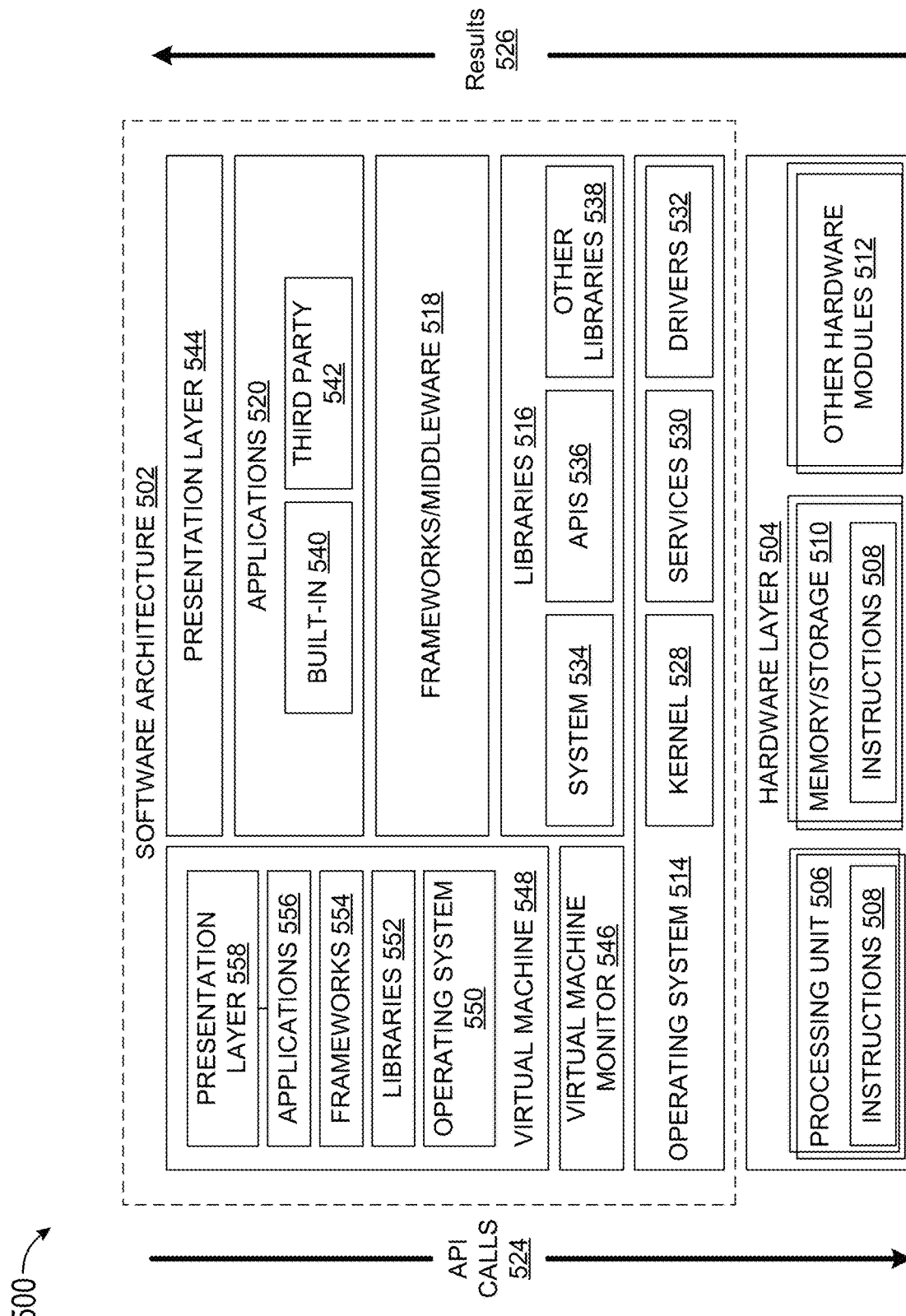
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 520 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 524 to create user interfaces to interact with users.

Some software architectures use virtual machines, as illustrated by a virtual machine 528. The virtual machine 548 provides an execution environment where applications/modules can execute as if they were executing on a hardware machine (such as the machine 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 528 such as an OS 550, libraries 552, frameworks 554, applications 556, and/or a presentation layer 558.

Figure 6:
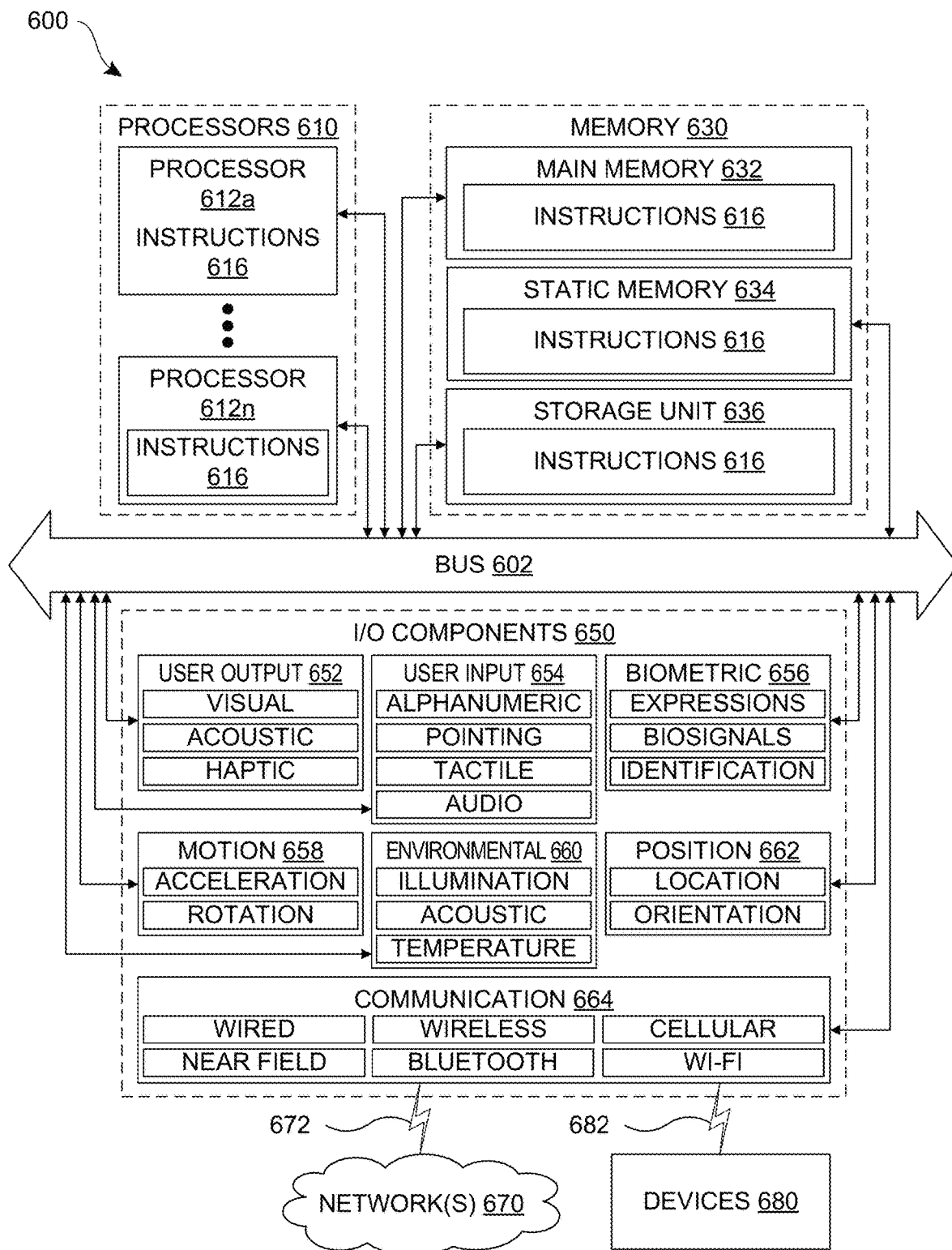
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof.

Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers).

In further examples, the I/O components 650 may include motion components 658, which may include acceleration and/or rotation sensors. In embodiments, the I/O components 650 may include environmental components 660, which may include illumination, acoustic, and/or temperature sensors. In further embodiments, the I/O components 650 may include position components 660, which may include location and/or orientation sensors.

The I/O components 650 may also include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

Devices and methods for improving speech recognition in ASR systems using a combination of deep learning models are described. Devices can include a data processing system which includes processor, and a memory in communication with the processor, the memory comprising executable instructions that, when executed by the processor, cause the data processing system to perform various functions. The functions may include receiving speech data for a plurality of locales, determining graphemes from the speech data, normalizing the speech data using the determined graphemes, building a model using the normalized speech data, and recognizing words in a target locale using the model.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the instant application will be described by means of items:

Item 1. A data processing system comprising:
  a processor; and
  a machine-readable storage medium storing executable instructions that, when executed, cause the processor to perform operations comprising:
    receiving speech data for a plurality of languages;
    determining letters from the speech data;
    normalizing the speech data by applying linguistic based rules for Latin-based languages on the determined letters;
    building a computer model using the normalized speech data;
    fine-tuning the computer model using additional speech data; and
    recognizing words in a target language using the fine-tuned computer model.

Item 2. The data processing system of item 1, wherein the plurality of languages include English, French, Italian, German, and Spanish languages and the speech data includes over 10,000 hours of data for each language.

Item 3. The data processing system of any one of items 1-2, wherein the determining letters from the speech data includes using natural language processing.

Item 4. The data processing system of any one of items 1-3, wherein the machine-readable storage medium includes instructions configured to cause the processor to perform an operation of:
  receiving target speech data of the target language for the recognizing the words in the target language.

Item 5. The data processing system of any one of items 1-4, wherein the computer model is a Long Short-Term Memory model that has a top layer fine-tuned by the additional speech data.

Item 6. The data processing system of any one of items 1-5, wherein the speech data includes data from video, broadcast, and dictation sources for English, French, Italian, German, and Spanish languages.

Item 7. The data processing system of any one of items 1-6, wherein the machine-readable storage medium includes instructions configured to cause the processor to perform an operation of:
  collecting the speech data from video, broadcast, and dictation sources.

Item 8. The data processing system of any one of items 1-7, wherein the normalizing the speech data includes mapping the determined letters to source letters of a source language using the linguistic based rules.

Item 9. A method implemented in a data processing system, the method comprising:
  receiving speech data for a plurality of languages;
  determining letters from the speech data;
  normalizing the speech data by mapping the determined letters to source letters of a source language using linguistic based rules for Latin-based languages;
  building a computer model using the normalized speech data;
  fine-tuning the computer model using additional speech data;
  receiving target speech data of a target language; and
  recognizing words of the target language in the target speech data using the fine-tuned computer model.

Item 10. The method of item 9, further comprising:
  collecting the speech data from video, broadcast, and dictation sources.

Item 11. The method of any one of items 9-10, wherein the determining letters from the speech data includes using natural language processing.

Item 12. The method of any one of items 9-11, wherein the computer model is a transformer model that has a top layer fine-tuned by the additional speech data.

Item 13. The method of any one of items 9-11, wherein the computer model is a Bidirectional Long Short-Term Memory model that has a top layer fine-tuned by the additional speech data.

Item 14. The method of any one of items 9-11, wherein the computer model is a Latency-Control Bidirectional Long Short-Term Memory model that has a top layer fine-tuned by the additional speech data.

Item 15. The method of any one of items 9-14, wherein the plurality of languages includes English, French, Italian, German, and Spanish languages and the speech data includes over 10,000 hours of data for each language.

Item 16. The method of any one of items 9-15, wherein the normalizing the speech data includes linguistic rule-based mapping to map the determined letters to the source letters of the source language linguistic based rules.

Item 17. A machine-readable medium on which are stored instructions that, when executed, cause a processor of a programmable device to perform operations of:
  receiving speech data for a plurality of different languages;
  determining letters from the speech data;
  normalizing the speech data by mapping the determined letters to source words of a source language using linguistic rule-based rules for Latin-based languages;

building a computer model using the normalized speech data;

fine-tuning the computer model using additional speech data;

receiving target speech data of a target language; and recognizing target words of the target language in the target speech data using the fine-tuned computer model.

Item 18. The machine-readable medium of item 17, wherein the different languages include English, French, Italian, German, and Spanish languages and the speech data includes over 10,000 hours of data for each language.

Item 19. The machine-readable medium of any one of items 17-18, wherein the computer model is a Bidirectional Long Short-Term Memory model that has a top layer fine-tuned by the additional speech data.

Item 20. The machine-readable medium of any one of items 17-18, wherein the computer model is a Latency-Control Bidirectional Long Short-Term Memory model that has a top layer fine-tuned by the additional speech data.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
    a processor; and
    a machine-readable storage medium storing executable instructions that, when executed, cause the processor to perform operations comprising:
    receiving speech data for a plurality of languages;
    identifying and extracting graphemes from the speech data using a grapheme extraction engine;
    normalizing the speech data using a normalizing engine that applies linguistic based rules for Latin-based languages to map the graphemes from the speech data to graphemes in a Latin-based language;
    building a computer model using the normalized speech data;
    fine-tuning the computer model using additional speech data; and
    recognizing words in a target language using the fine-tuned computer model,
    wherein the computer model is a Long Short-Term Memory model that has a top layer fine-tuned by the additional speech data.

2. The data processing system of claim 1, wherein the plurality of languages include English, French, Italian, German, and Spanish languages and the speech data includes over 10,000 hours of data for each language.

3. The data processing system of claim 1, wherein identifying and extracting the graphemes from the speech data using the grapheme extraction engine includes using natural language processing.

4. The data processing system of claim 1, wherein the machine-readable storage medium includes instructions configured to cause the processor to perform an operation of:
    receiving target speech data of the target language for the recognizing the words in the target language.

5. The data processing system of claim 1, wherein the speech data includes data from video, broadcast news, and dictation sources for English, French, Italian, German, and Spanish languages.

6. The data processing system of claim 1, wherein the machine-readable storage medium includes instructions configured to cause the processor to perform an operation of:
    collecting the speech data from video, broadcast news, and dictation sources.

7. A method implemented in a data processing system, the method comprising:
- receiving speech data for a plurality of languages;
- identifying and extracting graphemes from the speech data using a grapheme extraction engine;
- normalizing the speech data using a normalizing engine that applies linguistic based rules for Latin-based languages to map the graphemes from the speech data to graphemes in a Latin-based language;
- building a computer model using the normalized speech data;
- fine-tuning the computer model using additional speech data;
- receiving target speech data of a target language; and
- recognizing words of the target language in the target speech data using the fine-tuned computer model,
- wherein the computer model is a transformer model that has a top layer fine-tuned by the additional speech data.

8. The method of claim 7, further comprising:
- collecting the speech data from video, broadcast news, and dictation sources for English, French, Italian, German, and Spanish languages.

9. The method of claim 7, wherein identifying and extracting the graphemes from the speech data using the grapheme extraction engine includes using natural language processing.

10. The method of claim 7, wherein the computer model is a Latency-Control Bidirectional Long Short-Term Memory model that has a top layer fine-tuned by the additional speech data.

11. The method of claim 7, wherein the plurality of languages includes English, French, Italian, German, and Spanish languages and the speech data includes over 10,000 hours of data for each language.

12. A non-transitory machine-readable medium on which are stored instructions that, when executed, cause a processor of a programmable device to perform operations of:
- receiving speech data for a plurality of different languages;
- identifying and extracting graphemes from the speech data using a grapheme extraction engine;
- normalizing the speech data using a normalizing engine that applies linguistic based rules for Latin-based languages to map the graphemes from the speech data to graphemes in a Latin-based language;
- building a computer model using the normalized speech data;
- fine-tuning the computer model using additional speech data;
- receiving target speech data of a target language; and
- recognizing target words of the target language in the target speech data using the fine-tuned computer model;
- wherein the computer model is a Bidirectional Long Short-Term Memory model that has a top layer fine-tuned by the additional speech data.

13. The non-transitory machine-readable medium of claim 12, wherein the plurality of different languages includes English, French, Italian, German, and Spanish languages and the speech data includes over 10,000 hours of data for each language.

14. The non-transitory machine-readable medium of claim 12, wherein the computer model is a Latency-Control Bidirectional Long Short-Term Memory model that has a top layer fine-tuned by the additional speech data.

* * * * *